(12) United States Patent
Smith et al.

(10) Patent No.: US 8,055,970 B1
(45) Date of Patent: Nov. 8, 2011

(54) SYSTEM AND METHOD FOR PARALLEL PROCESSING OF DATA INTEGRITY ALGORITHMS

(75) Inventors: Brian N. Smith, Richardson, TX (US); Scott R Oksanen, Wylie, TX (US); Jon D. Johnson, Richardson, TX (US)

(73) Assignee: Raytheon Company, Waltham, MA (US)

( * ) Notice: Subject to any disclaimer, the term of this patent is extended or adjusted under 35 U.S.C. 154(b) by 1124 days.

(21) Appl. No.: 11/559,369

(22) Filed: Nov. 13, 2006

Related U.S. Application Data

(60) Provisional application No. 60/736,217, filed on Nov. 14, 2005.

(51) Int. Cl.
*H03M 13/00* (2006.01)

(52) U.S. Cl. .......................... 714/752; 714/754; 714/763

(58) Field of Classification Search .................. 714/752, 714/754, 758, 718, 763, 735; 711/141, 108
See application file for complete search history.

(56) References Cited

U.S. PATENT DOCUMENTS

| | | | | |
|---|---|---|---|---|
| 5,765,157 A | * | 6/1998 | Lindholm et al. | 707/101 |
| 5,828,880 A | * | 10/1998 | Hanko | 718/106 |
| 6,715,116 B2 | * | 3/2004 | Lester et al. | 714/718 |
| 6,989,835 B2 | * | 1/2006 | Deering et al. | 345/502 |
| 7,200,721 B1 | * | 4/2007 | Lang et al. | 711/141 |
| 7,260,673 B1 | * | 8/2007 | Ross | 711/108 |
| 7,343,377 B1 | * | 3/2008 | van Opdorp | 707/100 |
| 7,369,574 B1 | * | 5/2008 | Parruck et al. | 370/474 |
| 7,684,563 B1 | * | 3/2010 | Olson et al. | 380/28 |

OTHER PUBLICATIONS

Joseph D. Touch; "Report on MD5 Performance;" Network Working Group Request for Comments: 1810; Category: Informational; 7 pages, Jun. 1995.
Joseph D. Touch; "Performance Analysis of MD5;" USC/Information Sciences Institute; appeared in the proceedings of Sigcomm '95, Boston MA.; 23 pages.

\* cited by examiner

*Primary Examiner* — Fritz Alphonse
(74) *Attorney, Agent, or Firm* — Baker Botts L.L.P.

(57) ABSTRACT

According to one embodiment of the invention, a computer implemented method for computing a data integrity algorithm on a data stream comprises the acts of initializing a plurality of threads, partitioning the data stream into a plurality of data stream segments, calculating a number of data integrity values from the plurality of data stream segments, and verifying the integrity of the data stream using the data integrity values. The plurality of threads are executed at generally the same time. Each of the data integrity values are derived from an associated data stream segment.

19 Claims, 2 Drawing Sheets

SYSTEM AND METHOD FOR PARALLEL PROCESSING OF DATA INTEGRITY ALGORITHMS

RELATED APPLICATIONS

This application claims the benefit of priority under 35 U.S.C. §119(e) of U.S. Provisional Application Ser. No. 60/736,217, filed Nov. 14, 2005, and entitled "PARALLEL PROCESSING OF DATA INTEGRITY ALGORITHMS".

TECHNICAL FIELD OF THE INVENTION

This invention relates to data integrity algorithms, and more particularly, to a system for the parallel processing of a data integrity algorithm and a method of operating the same.

BACKGROUND OF THE INVENTION

The digital transmission of data from one computing system to another has become an important facet of today's distributed computer architectures. To verify the reliability of this data following transit, a number of data integrity algorithms have been developed. These data integrity algorithms serve to ensure that data remains unaltered following transmission from one computing system to another. To accomplish this, a data integrity value may be calculated from the data integrity algorithm at the transmitting computing system and subsequently transmitted to the receiving computing system along with the data. Following receipt of the data, another data integrity value may be calculated and compared with the transmitted data integrity value. In this manner, a relatively high level of reliability of the data may be accomplished as it is transmitted from one computing system to another.

SUMMARY OF THE INVENTION

According to one embodiment of the invention, a computer implemented method for computing a data integrity algorithm on a data stream comprises the acts of initializing a plurality of threads, partitioning the data stream into a plurality of data stream segments, calculating a number of data integrity values from the plurality of data stream segments, and verifying the integrity of the data stream using the data integrity values. The plurality of threads are executed at generally the same time. Each of the data integrity values are derived from an associated data stream segment.

According to another embodiment of the invention, a system for computing a data integrity algorithm on a data stream comprises a computing system that is operable to initialize a plurality of threads, partition the data stream into a plurality of data stream segments, calculate a number of data integrity values from the plurality of data stream segments, and verify the integrity of the data stream using the data integrity values. The plurality of threads are executed at generally the same time. Each of the data integrity values are derived from an associated data stream segment.

Some embodiments of the invention provide numerous technical advantages. Some embodiments may benefit from some, none, or all of these advantages. For example, according to one embodiment, the validity of a data stream may be verified using a data integrity algorithm in a relatively shorter period of time as compared to conventional implementations. Conventional implementations of integrity algorithm systems and methods were limited to usage of the computing abilities of only one processor. That is, a multi-processor computing system having additional computing abilities would essentially remain under-utilized, a problem that the teachings of the present invention does not have. According to some embodiments, an increase in throughput is accorded to the manner in which the data integrity algorithms are utilized. By creating multiple threads that act on multiple processors (if available), each thread executes one instance of the specified data integrity algorithm on a subset of the supplied data and computes a data integrity value for the subset that it processes. Such may be contrasted with a conventional usage of data integrity algorithms on multi-processor machines where one processor is heavily utilized while the remaining processors remain essentially idle. Thus, certain embodiments of the invention may provide for the usage of all available processors for the data integrity calculation resulting in throughput increases on multi-processor machines.

Other technical advantages may be readily ascertained by one of ordinary skill in the art.

BRIEF DESCRIPTION OF THE DRAWINGS

A more complete understanding of embodiments of the invention will be apparent from the detailed description taken in conjunction with the accompanying drawings in which.

DETAILED DESCRIPTION OF EXAMPLE EMBODIMENTS OF THE INVENTION

Figure 1:
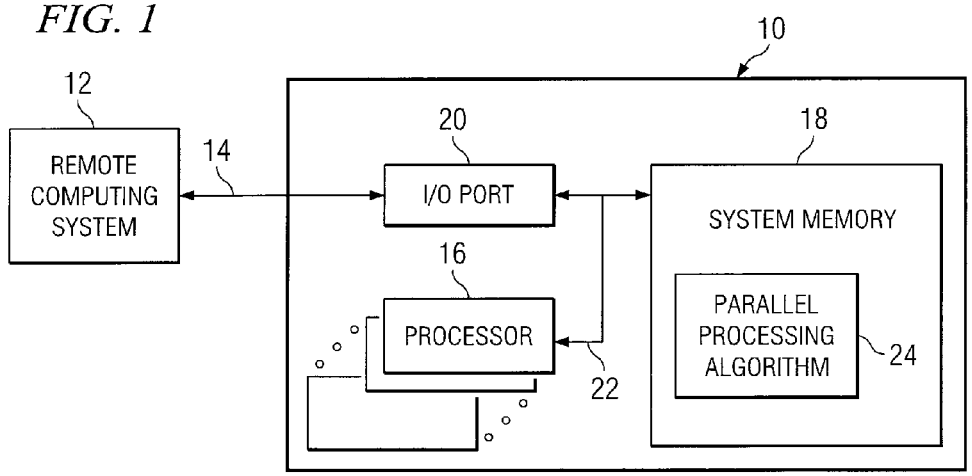
FIG. 1 is a block diagram showing one embodiment of a computing system that is capable of transmitting and receiving a data stream from a remote computing system.

According to various embodiments of the invention, an example computing system 10 is shown coupled to a remote computing system 12 using a transmission line 14. The computing system 10 generally includes one or more processors 16, a system memory 18, and at least one input/output port 20 that are all interconnected by a system bus 22. The one or more processors 16 are operable to execute a parallel processing algorithm 24 that may be stored in system memory 18. Parallel processing algorithm 24 generally has a number of executable instructions that are executable by processors 16 to calculate data integrity algorithms for one or more data streams.

In one embodiment, computing system 10 may comprise multiple processors that are capable of executing programs independently of one another. In this manner, the computing system 10 may be able to perform operations simultaneously such that the overall speed with which operations are performed on the computing system 10 may be increased. That is, the computing system 10 having two or more processors 16 may function simultaneously to process operations in a shorter amount of time. In one embodiment, the computing system 10 may incorporate a multi-core processor. A multi-core processor is a particular type of computing circuit that combines two or more independent processors into a single package or chip. One example of a multi-core processor is the Pentium™ D Processor available from Intel Corporation in Santa Clara, Calif. Nevertheless, other computing systems 10 having multiple processors that are not packaged in a single chip may also utilize the teachings of the present invention.

The system memory 18 may be random access memory (RAM), read-only memory (ROM), CD-ROM, magnetic disk memory, removable memory devices or other suitable devices that provide for the storage and retrieval of data. The system memory 18 may store data in the form of files, stacks, databases, caches, buffers, or other such form as is typically used by the computing system 10. The input/output port 20 is included to enable receipt of a data stream from the remote computer 12. The input/output port 20 may incorporate any protocol suitable for communication with the remote computer 12 that may be, for example, a protocol such as Ethernet, token ring, asynchronous transfer mode (ATM), frame relay, digital subscriber loop (DS1/DS3), or an optically based protocol such as one version of an optical carrier protocol (OCn).

In accordance with certain embodiments of the present invention, the computing system 10 may be operable to utilize parallel processing algorithm 24 to calculate an integrity value of a data stream received from the remote computing system 12 or system memory 18. In many cases, the integrity algorithm may be used to verify the consistency or reliability of data when the data stream is transmitted through the transmission line 14 or other digital transmission medium. The integrity algorithm may be a hash function that is calculated on data within the data stream prior to transmission in order to form an initial data integrity value. This data integrity value is transmitted along with the data such that, upon receipt of the data by the computing system 10, another data integrity value may be calculated in order to verify proper transmission of the data stream to the receiving computing system 10. In accordance with the present invention, computing system 10 may utilize the computing power of multiple processors 16 on the computing system 10. The integrity algorithm may be any suitable algorithm that may be, for example, one version of a cyclic redundancy check (CRC) algorithm, message-digest (MD) algorithm, or secure hash algorithm (SHA).

At least two types of data integrity algorithms may be utilized according to particular embodiments: cryptographic hashing algorithms (hashes) and cyclic redundancy checking (CRC) algorithms. Cryptographic hashing algorithms are generally computationally intensive and produce a highly "unique" result for a given set of data. Accordingly, cryptographic hashing algorithms are typically used as high-assurance data integrity tools. Cyclic redundancy checking algorithms are generally faster than cryptographic hashing algorithms but are not as "unique". Accordingly, cyclic redundancy checking algorithms are typically used when both data integrity assurance and speed of computations are important. Although cryptographic hashing algorithms and cyclic redundancy checking algorithms have been described above as two types of data integrity algorithms that may be utilized in particular embodiments, other types of data integrity algorithms may be utilized according to other embodiments.

The computing system 10 may receive the data stream from a remote computing system 12 coupled to the computing system 10 by the transmission line 14 or from the system memory 18. In one embodiment, the input/output port 20 may be configured to temporarily store incoming data in a buffer for use by the computing system 10. In another embodiment, the computing system 10 may temporarily store data from a data file located in system memory 18 in a buffer. In either case, the system memory 18 may incorporate a buffer that is configured to temporarily store data in the form of bits or bytes.

Figure 2:
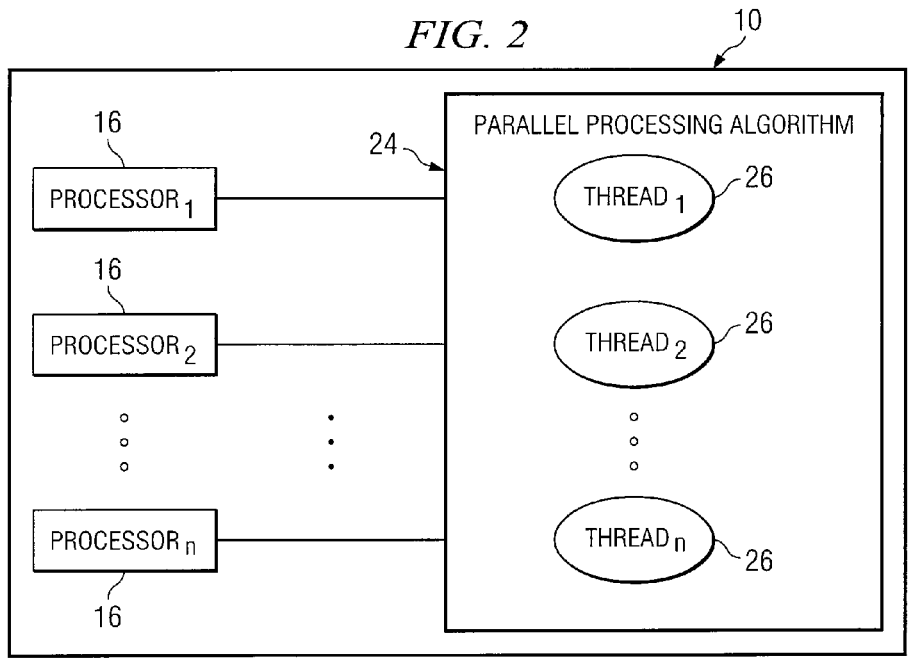
FIG. 2 is a block diagram of the computing system of FIG. 1 showing the interaction of a number of threads with a number of processors.

FIG. 2 shows the computing system 10 having several executable components that may be used to implement the system and method for parallel processing of integrity algorithms of the present invention. The computing system 10 may incorporate parallel processing algorithm 24 that may be executable on any suitable operating system to administer the core functionality of the one or more processors 16, system memory 18, and input/output port 20. Examples of commonly used operating systems may include the UNIX, LINUX, Windows, and OS/2 operating systems.

Parallel processing algorithm 24 may be configured to launch or instantiate multiple threads 26. Each of these threads 26 may be capable of executing one or more executable software programs independently of one another. Thus, to enable parallel processing of integrity algorithms, the system and method of the present invention may launch several threads 26. In one embodiment, parallel processing algorithm 24 may utilize each of the processors 16 using threads 26. A computing system 10 that is configured to launch multiple threads 26 may be referred to as a "multithreading" computing system 10. Thus, parallel processing algorithm 24 may be operable to utilize the computing abilities of each processor 16 using threads 26.

Each of these threads 26 may be executed by the one or more processors 16. The parallel processing algorithm 24 may launch any suitable number of threads 26. If the computing system 10 has only one processor 16, then the threads 26 may be executed by the one processor 16. In one embodiment, the quantity of threads 26 is equivalent the quantity of processors 16 in the computing system 10. In another embodiment, the quantity of threads 26 may be independent of the quantity of processors 16 in computing system 10. That is, parallel processing algorithm 24 may launch more threads 26 than processors 16 existing on computing system 10. Alternatively, parallel processing system 24 may launch fewer threads 26 than processors 16 existing on computing system 10. The parallel processing algorithm 24 may select the number of threads 26 based upon various factors, such as current processing load of processors 16, size of the data stream, anticipated loading of the processors 16, or other such related factors.

Figure 3:
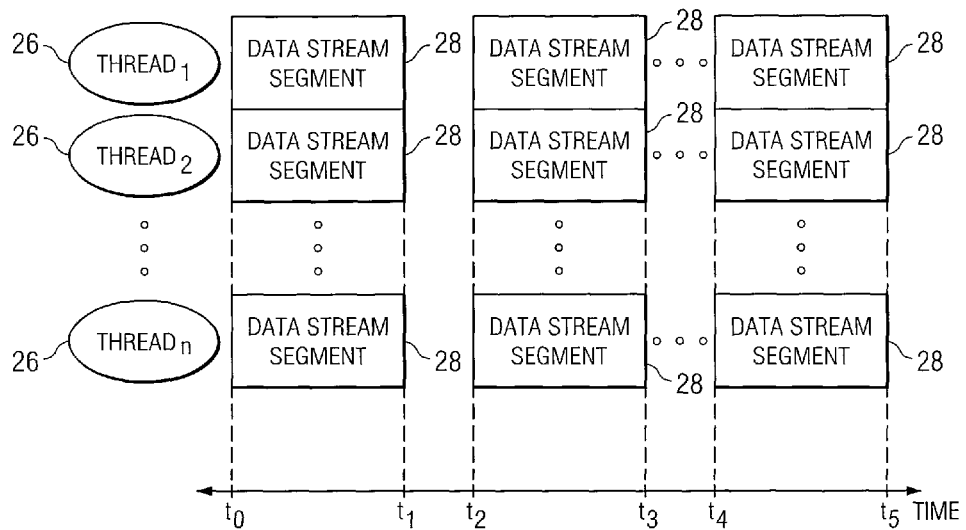
FIG. 3 is a timing diagram showing how data integrity values for multiple data stream segments may be calculated according to the embodiment of FIG. 1.

FIG. 3 is a time chart showing how the multiple threads 26 may be utilized to concurrently calculate data integrity values for the data stream. The parallel processing algorithm 24 may be operable to partition the data stream into a plurality of data stream segments 28. In this manner, a data integrity value may be calculated for each data stream segment using each of the plurality of threads 26. In one embodiment, each data stream segment 28 has a generally equivalent byte size such that the processing load is shared in a generally even manner among multiple threads 26. In another embodiment, each data stream segment 28 is sufficiently small in size such that data integrity values may be calculated for multiple data stream segments 28 on each thread 26.

A number of threads 26 are configured to concurrently calculate a data integrity value for a number of corresponding data stream segments 28. In this particular embodiment, each of the data stream segments has a predetermined byte size and thus the time required to calculate the data integrity values may be generally equal. Time indicators $t_0$ to $t_1$ indicate a beginning time and ending time respectively in which data integrity values may be concurrently calculated for several data stream segments 28. Time indicators $t_2$ to $t_3$ indicate a beginning time and ending time respectively in which data integrity values may be concurrently calculated for several more data stream segments 28. Time indicators $t_4$ to $t_5$ indicate a beginning time and ending time respectively in which data integrity values may be concurrently calculated for yet several more data stream segments 28.

Figure 4:
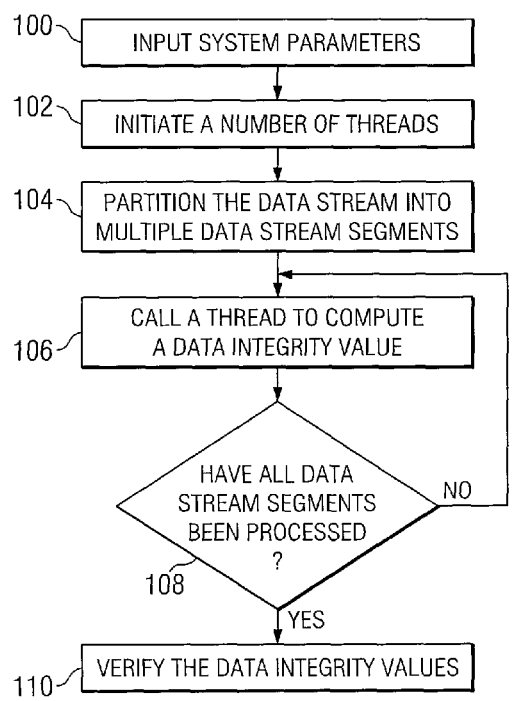
FIG. 4 shows a sequence of acts that may be utilized to implement the embodiment of FIG. 1.

FIG. 4 depicts a series of actions that may be performed by parallel processing algorithm 24 in order to calculate data integrity values on a data stream using multiple threads 26. In act 100, parallel processing algorithm 24 may receive several input parameters. In one embodiment, the input parameters may include the type of integrity algorithm to be used, the size of each data stream segment 28, and the number of threads 26 to be used. As described above, the type of integrity algorithm may be similar to the integrity algorithm used in conjunction with the remote computing system 12. The parallel processing algorithm 24 may also receive a numeric value representing the quantity of threads 26 to be used in performing the data integrity calculation. In one embodiment, the quantity of threads 26 may be set to the number of processors 16 within computing system 10. In this manner, the processing load of the integrity algorithm may be at least partially shared among all of the processors 16. It should be appreciated however, that the number of threads 26 launched by the parallel processing algorithm 24 may be greater than or fewer than the number of processors 16. The byte size of the data stream segment may also be inputted in act 100. For example, the data stream segment size may be set to a value that falls within a commonly used block boundary of a computer storage system, such as 1024, 2048, or 4096 bytes.

The previously described input parameters may be manually inputted by a user, or may be inputted by executable instructions of parallel processing algorithm 24. For example, parallel processing algorithm 24 may determine during execution, that a total of two processors 16 exist within the computing system 10. In this case, parallel processing algorithm 24 may set the number of threads 26 equal to a numeric value of two. In another example, parallel processing algorithm 24 may determine during execution, that a four processors 16 exist within the computing system 10; however, one of those processors 16 is currently exhibiting heavy usage. In this case, the computing system 10 may set the number of processes to three. In yet another example, parallel processing system 24 may determine during execution, that a total of two hyper-threading processors exist on the system. A hyper-threading processor is a type of processor that has only one processing core, yet is capable of handling certain operations simultaneously with operations of another thread 26. Thus, parallel processing algorithm 24 may launch a total of four threads on this type of computing system 10.

Once the input parameters have been inputted, the number of threads specified in act 100 may be initialized for use in act 102. In one embodiment, a new thread 26 may be launched or instantiated by the system for each of the number of processors specified in act 100. In another embodiment, existing threads 26 may be used in order to perform the data integrity calculations. In act 104, the data stream may be partitioned into multiple data stream segments 28. This action is performed so that the parallel processing algorithm 24 may distribute the processing load to each of the threads 26. In one embodiment, the quantity of data stream segments 28 is equal to or greater than the number of threads 26. In another embodiment, the data stream is partitioned such that several data stream segments 28 may be consecutively processed on each thread 26. If the data stream originates as a real time signal from the transmission line 14, the data stream may be partitioned as data is received in a buffer of the system memory 18. Alternatively, if the data stream originates from a data file, the entire data file may be partitioned prior to calculation of the data integrity values.

In act 106, the parallel processing algorithm 24 may call each of the threads 26 instantiated in act 102 in order to calculate a data integrity value for each of the data stream segments 28. In one embodiment, the parallel processing algorithm 24 may then wait for threads 26 to each return a data integrity value indicating completion of the calculation of the data integrity value. In another embodiment, another controlling thread may administer control over the threads 26 to return calculated values and to initiate calculation of a new data stream segment 28. This data integrity value is stored by the computing system 10 for reasons to be described below. Following calculation of the data integrity values, their associated threads 26 become idle and thus may be available to calculate another data integrity value. In act 108, the parallel processing algorithm 24 determines if another data integrity value is to be calculated for a corresponding data stream segment 28. If so, threads 26 are again called in order to calculate data integrity values for other data stream segments 28.

If another data stream segment 28 does not need to be calculated, processes continues at step 110. After data integrity values are calculated for each of the data stream segments 28, the data integrity values that were previously stored may be verified to ensure the integrity of the data stream. In one embodiment, the data integrity values may be combined into a single value. One approach to combining the data integrity values may be to calculate a single hash value from all of the previously calculated data integrity values. This single hash value may then be compared with a single hash value transmitted from the remote computing system 12 in order to verify the integrity of the data stream. Another approach to combining the data integrity values may be to perform a bit-wise logical exclusive OR (XOR) on all of the previously calculated data integrity values. In yet another approach, the data integrity values calculated using each thread 26 may be combined during act 108 such that a quantity of data integrity values are equal to the number of threads 26. Using this approach, the combined data integrity values may be further combined into a single data integrity value for verification by the system.

The system and method described with reference to FIGS. 1 through 4 may be utilized in a variety of applications. For example, the method, among other potential applications, may be utilized to verify digital signatures.

Tests conducted using an example of the above described parallel processing method of data integrity algorithms resulted in particular embodiments with a 85.9% throughput increase using MD5, a 87.5% throughput increase using SHA-1, and 150% throughput increase using CRC-32. Such results were achieved by comparing a standard single process data integrity system versus the parallel processing implementation using a dual-processor Intel Xeon machine with Hyper Threading with a 1 Giga-byte test file. The term "MD5" may be referred to as a particular version of message digest integrity algorithm. The term "SHA-1" may be referred to as a particular version of the secure hash integrity algorithm. The term "CRC-32" may be referred to as a particular version of the cyclic redundancy check integrity algorithm.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A computer implemented method for computing a data integrity algorithm on a data stream comprising:

initializing a plurality of threads on a computing system having a plurality of processors, each of the plurality of threads capable of executing one or more executable software programs on the computing system, the number of the plurality of threads being less than, equal to, or greater than the number of the plurality of processors;

partitioning the data stream into a plurality of data stream segments such that each of the plurality of data stream segments has a predetermined size, each of the data stream segments being sufficiently small such that one of the plurality of threads is operable to consecutively calculate at least two of the data stream segments;

calculating a plurality of data integrity values from the plurality of data stream segments by executing each of the plurality of threads at generally the same time;

combining the plurality of data integrity values into a single data integrity value; and verifying the integrity of the data stream using the single data integrity value.

2. The computer implemented method of claim 1, wherein the data stream is obtained from an input/output port of the computing system.

3. The computer implemented method of claim 1, wherein the data stream is obtained from a system memory of the computing system.

4. The computer implemented method of claim 1, wherein the data integrity algorithm is an algorithm selected from the group consisting of one version of a cyclic redundancy check (CRC) algorithm, message-digest (MD) algorithm, and secure hash algorithm (SHA).

5. The computer implemented method of claim 1, wherein the data stream includes an initial single data integrity value and verifying the integrity of the data stream using the single data integrity value comprises comparing the single data integrity value with the initial single data integrity value.

6. A computer implemented method comprising:

initializing, with one or more of a plurality of processors a plurality of threads on a computing system, each of the plurality of threads capable of executing one or more executable software programs on the computing system;

partitioning a data stream received from a remote computing system into a plurality of data stream segments;

calculating a plurality of data integrity values from the plurality of data stream segments by executing each of the plurality of threads at generally the same time; and verifying the integrity of the data stream using the plurality of data integrity values by:

combining the plurality of data integrity values into a single data integrity value; and verifying the integrity of the data stream using the single data integrity value.

7. The computer implemented method of claim 6, wherein the data stream is obtained from an input/output port of the computing system.

8. The computer implemented method of claim 6, wherein the data stream is obtained from a system memory of the computing system.

9. The computer implemented method of claim 6, wherein each of the data stream segments has a predetermined byte size.

10. The computer implemented method of claim 9, wherein each of the data stream segments is sufficiently small such that one of the plurality of threads is operable to consecutively calculate at least two of the data stream segments.

11. The computer implemented method of claim 6, wherein the data integrity algorithm is an algorithm selected from the group consisting of one version of a cyclic redundancy check (CRC) algorithm, message-digest (MD) algorithm, and secure hash algorithm (SHA).

12. The computer implemented method of claim 6, wherein the act of combining the plurality of data integrity values further comprises combining the plurality of data integrity values using an exclusive OR function.

13. The computer implemented method of claim 6, wherein the act of combining the plurality of data integrity values further comprises combining the plurality of data integrity values by calculating a single hash value from the plurality of data integrity values.

14. The computer implemented method of claim 6, wherein the act of initializing a plurality of threads further comprises initializing a number of a plurality of threads that are less than equal to or greater than the number of the plurality of processors in the computing system.

15. The computer implemented method of claim 6, wherein the plurality of processors is a dual-core processor.

16. A computing system comprising:

a processor; and a computer-readable medium executable on the processor and operable, when executed on the processor to:

initialize a plurality of threads on a computing system, each of the plurality of threads capable of executing one or more executable software programs on the computing system;

partition a data stream received from a remote computing system into a plurality of data stream segments;

calculate a plurality of data integrity values from the plurality of data stream segments by executing each of the plurality of threads at generally the same time; and verify the integrity of the data stream using the plurality of data integrity values by:

combining the plurality of data integrity values into a single data integrity value; and verifying the integrity of the data stream using the single data integrity value.

17. The system of claim 16, wherein the computing system comprises a plurality of processors, the computer-readable medium being further operable by processor to initialize a number of a plurality of threads that is less than equal to or greater than a number of the plurality of processors.

18. The system of claim 16, wherein each of the data stream segments has a predetermined byte size.

19. The system of claim 16, wherein the data integrity algorithm is an algorithm selected from the group consisting of one version of a cyclic redundancy check (CRC) algorithm, message-digest (MD) algorithm, and secure hash algorithm (SHA).

* * * * *